United States Patent
Brandon et al.

(12) 
(10) Patent No.: US 6,220,603 B1
(45) Date of Patent: Apr. 24, 2001

(54) NON RETRACTABLE SEGMENTED PACKING RING FOR FLUID TURBINES HAVING SPECIAL SPRINGS TO REDUCE FORCES DURING SHAFT RUBBING

(76) Inventors: Ronald Earl Brandon, 652 Jubilee St., Melbourne, FL (US) 32940; David Earl Brandon, 2166 E. Hampton Rd., Binghamton, NY (US) 13903

( * ) Notice: Subject to any disclaimer, the term of this patent is extended or adjusted under 35 U.S.C. 154(b) by 0 days.

(21) Appl. No.: 09/114,127

(22) Filed: Jul. 13, 1998

(51) Int. Cl.[7] .................................................. F16J 15/447
(52) U.S. Cl. ............................ 277/419; 277/412; 277/413
(58) Field of Search .................................... 277/412, 413, 277/416, 418, 419, 421, 422

(56) References Cited

U.S. PATENT DOCUMENTS

| | | |
|---|---|---|
| 4,436,311 | 3/1984 | Brandon . |
| 5,395,124 | 3/1995 | Brandon . |
| 5,464,226 | * 11/1995 | Dalton ................................ 277/419 X |
| 5,709,388 | * 1/1998 | Skinner et al. ....................... 277/412 |
| 5,810,365 | 9/1998 | Brandon et al. . |

* cited by examiner

Primary Examiner—Anthony Knight
Assistant Examiner—Karlena D. Schwing
(74) Attorney, Agent, or Firm—Ross, Ross & Flavin

(57) ABSTRACT

A segmented seal ring and spring system for very low pressure drop zones in steam turbines for minimizing leakage between rotating and stationary components, and preventing damage and wear thereto, including a segmented seal ring, with first springs biased against the seal segments to urge the segments radially inwardly toward a small clearance position of the seal ring with respect to the turbine shaft secondary springs to counter the weight of the segments; with the combination of said springs gently urging the seal segments into the small clearance position while allowing clearance enlargement with small resulting forces on the shaft during periods of misalignment and rubbing.

2 Claims, 8 Drawing Sheets

NON RETRACTABLE SEGMENTED PACKING RING FOR FLUID TURBINES HAVING SPECIAL SPRINGS TO REDUCE FORCES DURING SHAFT RUBBING

BACKGROUND OF THE INVENTION

1. Field of the Invention

The present invention relates to seals employed in elastic fluid axial flow turbines and, more particularly, to segmented packing ring seals arranged both where rotatable shafts penetrate stationary turbine casings and, in addition, internal to the casings between stages and turbine sections.

2. Description of the Prior Art

Generally, such known seals prevent or reduce leakage of the fluid by creating small clearance areas with low flow coefficients between the rotating and stationary parts. Improved efficiency, minimized loss of fluid and prevention of undesirable side effects caused by leakage of fluid are objectives of such seals.

Also, these segmented, labyrinth type seals are vulnerable to rubbing damage caused by turbine misalignment, vibration and thermal distortion. Most of these damage causing factors are more likely to occur during starting, at light loads or following sudden loss of load. As a result, not only do the seals become worn, but at the point of rubbing, heat is generated in the shaft causing bowing of the shaft with resultant vibration and increased damage to additional shaft packing seals and the even more critical tip seals that limit leakage past rotating blades.

Traditional segmented packing rings employ springs that force the segments toward the shaft as limited by shoulders on the packing ring holder. The springs are normally designed to provide assurance that all segments will be pushed inward until limited by either the shaft or the shoulders. The lowest segment requires the greatest force, since the weight of all higher segments must often be supported by the lowest one, thus requiring a spring force equal to the weight of all segments, plus some safety margin for unavoidable friction. Since each segment normally has the same spring behind it, the force that must be overcome by the shaft to make any of the packing segments shift positions is quite large, with the unavoidable ability to generate large amounts of local heat in the shaft.

U.S. Pat. No. 4,436,311 issued to Ronald E. Brandon describes retractable packing rings which, during start-up conditions, have large radial clearance that automatically decreases to a small clearance condition when a predetermined flow condition has been reached. Such rings have been successfully applied in turbine applications where the pressure forces are significantly greater than the weight forces of the packing segments. In the low pressure stages, however, weight forces are often too large to be successfully overcome by available turbine pressure forces.

In U.S. Pat. No. 5,395,124 issued to Ronald E. Brandon there is disclosed a segmented, retractable, labyrinth-type shaft sealing system for low pressure turbines wherein the packing segments are provided with a combination of gravity or levitation springs that provide a vertical force to neutralize segment weight forces and butt springs that resist pressure forces so as to cause a large clearance at turbine start up and then permit segment motion to allow the clearance to become small after operational conditions are established.

Retractable designs, however, cannot be readily applied to several turbine packing locations. These include, but are not limited to, the outer three packing rings in each turbine casing and double flow nozzle diaphragms.

With regard to the three outer rings it has not been possible to use retractable rings in these turbine locations due to the fact that they must be in the closed position during start up, and also, they must operate for the most part with the same pressure drop at all operating conditions.

As originally designed, these packing rings must employ relatively strong back springs that support the segments and simultaneously force them toward the shaft, yet during periods of shaft misalignment when the packing is rubbing the shaft, allow the segments to yield. Because of the relatively high spring force, the rubbing contact of shaft and packing teeth generates significant amounts of heat in the shaft, leading to bowing, rubbed packing teeth and tip seals, vibration and aborted start ups. The thermodynamic losses are significant.

The heat generated during such events is proportional to the spring force that resists the temporary motion of the packing segment when the teeth are in contact with the rotating shaft. It is thus desirable to minimize the spring force selected to keep the segments in the closed position. It is expected that this will reduce heat generation to less than one-third that experienced in original designs.

In some intermediate pressure turbine sections and almost all low pressure turbine sections, a double flow entry nozzle is provided. This nozzle needs a packing ring to prevent leakage along the shaft from one end of the nozzle to the other. This is due to the fact that the pressure never turns out to be exactly the same at both sides. Leakage effects can be serious since a 1% leak will cause a 1% stage loss at each end of the nozzle.

These segments cannot be made retractable since there is no designated pressure difference on which to base closing forces. As a result, when being rubbed by the shaft these rings can cause significant vibration and shaft bowing. The undesirable effects are magnified by the fact that the double flow nozzle is highly likely to distort during both transient and steady state operation, and, worse, being located in the center of the span, to cause severe bowing of the shaft.

In both of the above cases it would be desirable to reduce the spring forces, yet still assure a closing motion of packing segments when the rubbing condition is over. That is the purpose of this invention.

SUMMARY OF THE INVENTION

Accordingly, it is an object of the present invention to provide an improved seal or packing ring arrangement for turbine locations where only small pressure drops are present during normal operating conditions.

It is another object to provide seal ring arrangements for the three outer rings of turbine casings and the ring held in the double flow nozzle wherein the spring forces that resist yielding of the seal ring segment during shaft rubbing episodes are minimized yet still capable of returning the packing segments to the closed position when the rubbing condition has ended.

It is another object to provide a seal ring arrangement wherein the seal ring segments during rubbing episodes cause a minimum amount of heat to be generated at the surface of the shaft and a minimum amount of shaft bowing as a result of the rubbing.

A still further object is to provide a seal ring arrangement having spring means arranged to effectively counteract the weight of the segments to reduce the spring force necessary to keep the packing segments in a minimum clearance position.

Another object is to decrease the cost of maintaining turbines due to seal damage, while increasing operating efficiency by permitting smaller operating clearance with lower leakage flow coefficients than presently known.

These, and other objects, are achieved by the present invention which provides a segmented seal ring and spring system for steam turbines for minimizing leakage between rotating and stationary components, including a segmented seal ring being supported by and at least partially contained in an annular T-shaped or L-shaped groove formed in the turbine casing and extending circumferentially around the turbine shaft. The spring system includes springs positioned to be biased against the segments of the seal ring to urge the segments radially inwardly toward a small clearance position of the seal ring with respect to the turbine shaft, yet with the use of minimum force.

The individual strengths of the springs are selected depending on the circumferential positions of the seal segments, the fluid pressure forces, and the weight and friction forces to thereby assure that the seal ring segments are in the small clearance position at all times except when misalignment and contact with the shaft causes one or more segments to be shifted from that position.

A special gravity or levitation spring is provided in the lowest, lower half seal ring segment with the lower end of such spring in contact with the turbine casing while the upper spring end is biased against the seal segment to produce an upward force on the segments to counter the downward force caused by the weight of the segments. The gravity spring has a spring force in the vertical direction which is approximately equal to the weight of all the segments which it supports, so that during shaft rubs, the force required by the shaft to shift the seal segment outward is minimized. When the rubbing period is over, the spring can allow return of the segment to the normal closes position.

The top segment is supported by coil springs mounted in the upper butts of the two segments located under the top segment. The combined vertical force component of the two coil springs is selected to be somewhat less than the weight of the top segment.

The upper side segments will require inward forcing springs with enough force to overcome friction plus the horizontal component of the spring supporting the upper segment. The friction can be reduced by the addition of butt-mounted coil springs under the segment with force approximately equal to the weight of all segments which are supported by the spring.

The upper half segments will benefit from being isolated from the lower segments and supported from the horizontal joints, although this is not necessary.

Lower half side segments can be supported directly on the lower segment, although a butt-mounted coil spring would reduce the sliding friction when the segment is returning to the closed position after a rubbing incident. As with the upper side segments, a radial spring force must be provided to return the segment to its closed position.

An alternate seal ring would employ two 180° segments, each split and hinged at the top and bottom. The bottom hinged section would employ a lateral spring on both sides below the horizontal joint to keep the sides of the seal ring pushed toward the minimum clearance position while a single gravity spring at the bottom would compensate for most of the weight. The upper 180° segment would use two side springs pushing upward to compensate for most of the weight.

Improved segment motion characteristics may be obtained by increasing the length of the top and bottom segments such as to 120°, while making each side segment smaller, such as four 30° segments, one above and one below the horizontal joint on each side.

The lower segments can be further assisted in closing to the small clearance position at the side locations by the addition of springs pushing the segments radially inwardly near the horizontal joints.

The upper and lower segments may be made to have direct or indirect contact with each other.

DESCRIPTION OF THE PREFERRED EMBODIMENTS

Figure 1:
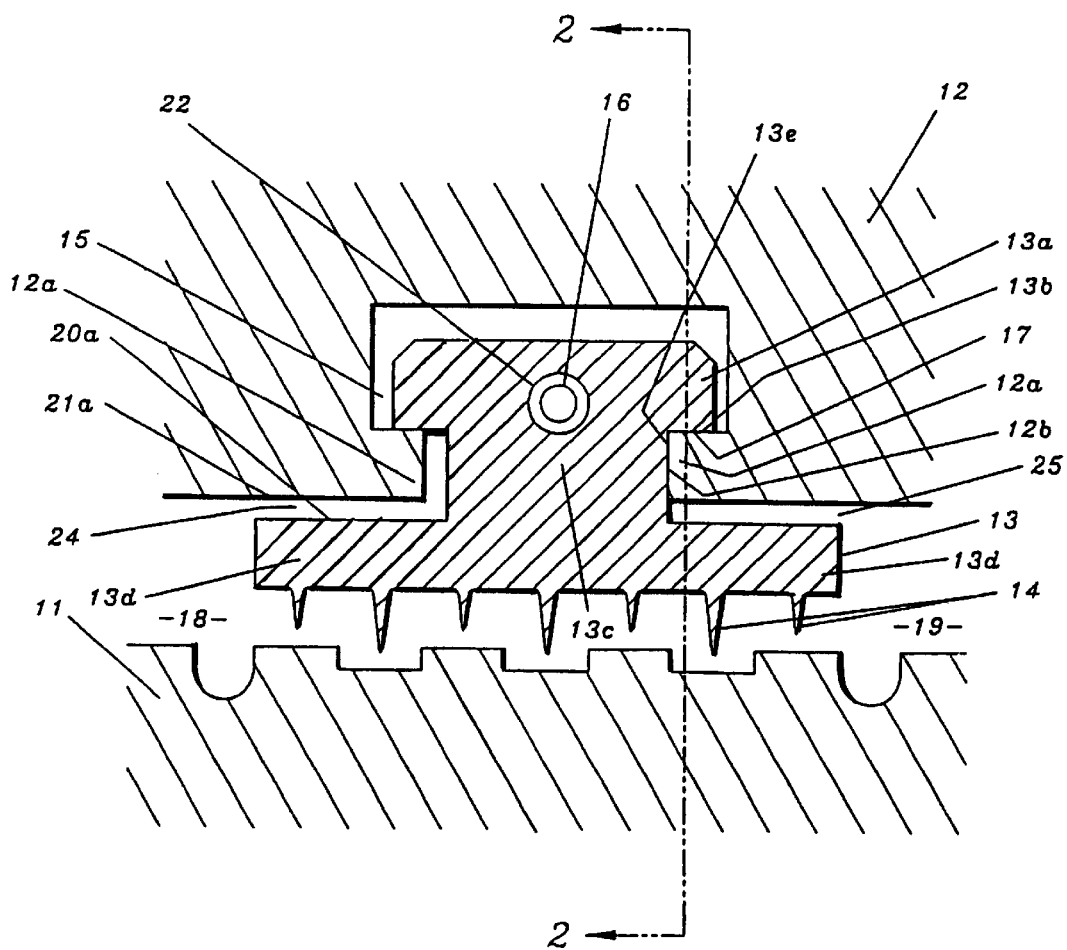
FIG. 1 is a partial longitudinal sectional view of a horizontal elevation of a portion of one seal ring of a multistage axial flow elastic turbine embodying the invention, with the section being taken through one segment of a segmented seal ring.
Figure 2:
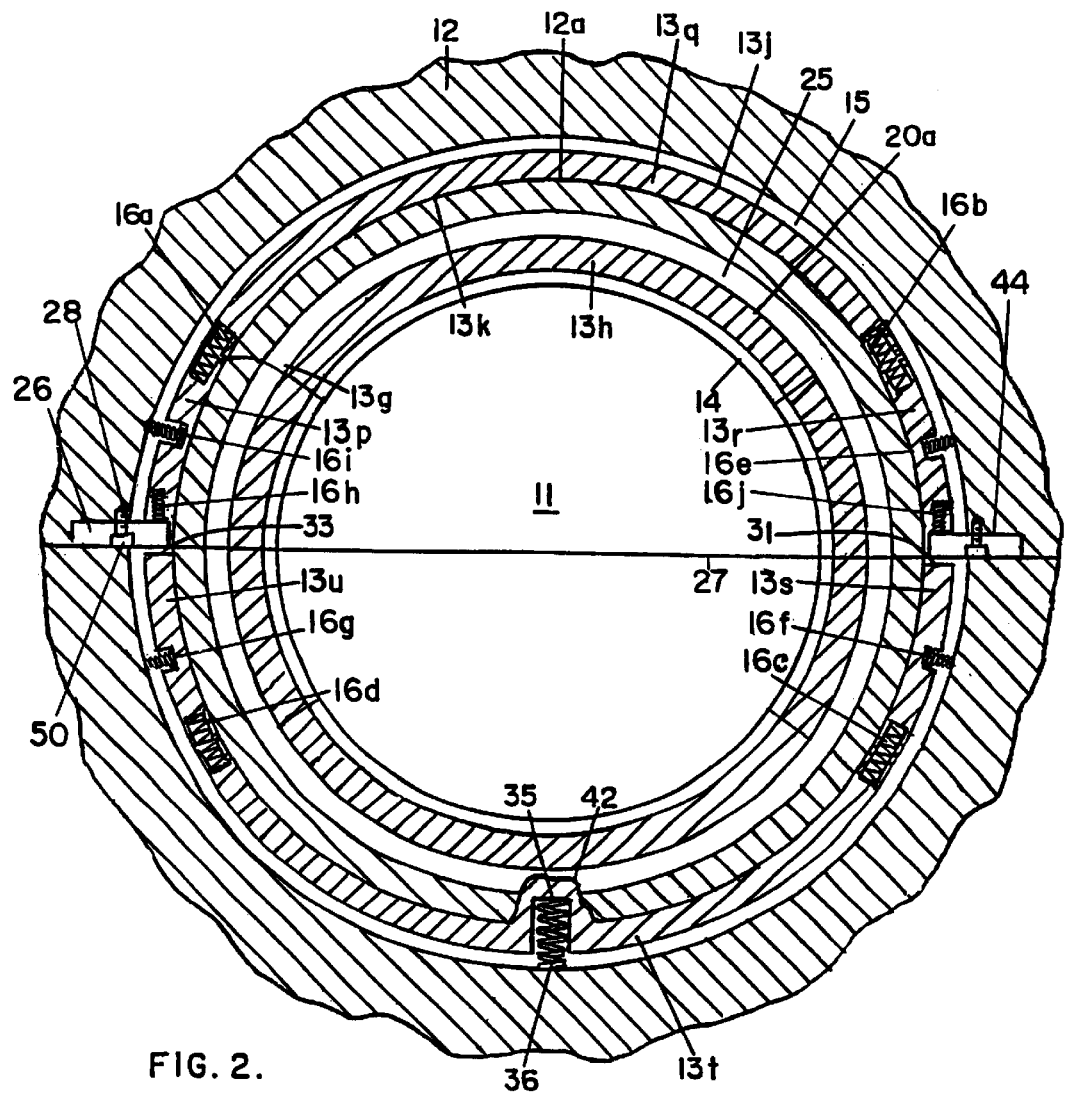
FIG. 2 is a transverse cross sectional view taken along lines 2—2 of FIG. 1 showing a six segment seal ring with springs for biasing the segments radially inwardly, with supporting springs under all the segments including a gravity spring under the lowest sealing ring segment, according to one embodiment of the invention.

Referring to FIGS. 1 and 2, the turbine includes a rotor or shaft, a portion of which is shown at 11, and a casing, a portion of which is shown at 12. With regard to interstage seals, it is noted that casing 12 may also be referred to as a diaphragm. A seal ring generally indicated by 13 is shown comprising six segments according to the embodiment shown in FIG. 2 extending around rotor 11. It should be understood that several such seal rings 13 could be arranged in series. Also, it should be understood that the remainder of the turbine necessarily includes means, not shown, for introducing steam at high pressures and exhausting it at lower pressures, with conventional nozzles, buckets, wheels and other components which do not need inclusion herein to describe the seal function which is carried out by the seal ring of the present invention. In general, the seal ring shown and described herein is typical of the many rings employed throughout the turbine, with the exception of the seal ring modifications made in combination with the spring design described herein according to the present invention. Also, it is to be understood that "seal ring 13" and "seal ring segment 13" as used herein may apply to either a ring or segment and, therefore, should be read in the context of the sentence describing the same.

Seal ring 13 includes a plurality of teeth 14 that are disposed in opposition to circumferential portions of rotor 11 which are alternately stepped up and down in radius. It is noted that other tooth arrangements may be employed. With high pressure fluid at side 18 of seal ring 13 and low pressure fluid at side 19, the left and right sides respectively of seal ring 13 shown in FIG. 1, there will be a positive force to cause fluid leakage between the multiple restrictions formed between the small clearance opening between teeth 14 and rotor 11. The combination of the clearance area, the relative sharpness of the teeth, the number of restrictions, the fluid conditions including pressure and density, and the geometry of the leakage path determine the amount of leakage flow according to formulae and empirical components which are well known.

Seal ring 13 is retained in a groove 15 of casing 12. According to the embodiment shown in FIG. 2, seal ring 13 is comprised of six segments 13p–13u arranged in a ring around rotor 11, with the segments being disposed within casing groove 15 to accommodate assembly or disassembly of the casing by locating the seal ring sections to separate at a joint 27 of the casing. Coil springs, generally indicated by the numeral 16 in FIG. 1, but more specificially indicated by 16a–16j in FIG. 2 are located at segment ends and are partially or fully contained in the packing segments 13p–13u.

Springs 16a–16d are contained in the butt ends of segments 13p, 13r, 13s and 13u. Springs 16a and 16b are sized to provide upward forces on segment 13q such that the sum of the two vertical components is almost equal to the weight of segment 13q when the butt clearance is zero. For example, if the spring forces are 90% of the weight, the rotor force necessary to raise segment 13q is greatly reduced from that existing when the original spring force was large such as six times the weight.

Springs 16c and 16d are located in butt ends of segments 13s and 13u to provide an upward force almost equal to the weight of segments 13s and 13u. This reduces the forces on the-rotor required to shift segments 13s or 13u outward should a misalignment condition cause a rub. It is noted that when segments 13s and 13u are very light, these two springs will be unnecessary.

Springs 16i, 16e, 16f and 16g are held in holes in the outer surface of segments 13p, 13r, 13s and 13u. They are sized to provide sufficient side force on the segments to overcome the sum of butt friction and side forces from the horizontal component of eight springs 16i, 16e, 16f or 16g so as to slide the four segments toward the minimum clearance position should a temporary rotor rub have caused any of them to be temporarily shifted outward. The springs could be of either flat, L-shaped design or of coil design as shown. Whichever design is chosen, note that the necessary spring force will be much less than traditionally found where the radial spring force could be expected to be about six times the segment weight. An additional spring similar to 16i could be added above segment 13q to discourage vibration of that unrestrained part.

A spring 36 in segment 13t is provided to elevate the bottom segment to its minimum clearance position. The force provided by spring 36 should be approximately equal to the combined weights of segments 13s, 13t and 13u. This insures that segment 13t will be held in the minimum clearance position, yet capable of radial downward motion with only a small force.

Springs 16h and 16j are held as shown in the lower butts of segments 13p and 13r. They provide a combined vertical force almost equal to the combined weight of segments 13p, 13q and 13r. Note that springs 16h and 16j forces are directed also to keys 26 which are bolted to the upper half of casing 12 so as to isolate the weight of segments 13p, 13q and 13r from the lower half segments 13s, 13t, and 13u. It would be possible to allow the upper segments to rest on the lower half segments, but it would result in some greater forces during shaft rubs.

Positive circumferential location of segments 13p–13u and retainment of the seal segments and springs 16a–16j are assured by anti-rotation keys 26 which are provided above casing joint 27. Each anti-rotation key 26 includes a rectangular key block fitted in grooves 44 in the left and right sides of casing 12. The key blocks protrude out from casing 12 into spaces 31 and 33 where such key blocks provide a fixed horizontal support surface for the upper segments of seal ring 13. Anti-rotation keys 26 are secured to casing 12 by mounting screws or bolts 50 attached at the left and right sides to key slots 44 by threaded screw ends 28 extending into casing 12 in grooves 44.

Note that the original manufacturer's springs have been completely removed.

The packing or seal rings which are the subject of this invention will generally have small pressure drops but the invention can be applied to any packing ring which is not adaptable to retractable designs. It will be necessary to determine the weight of seal ring segments 13, the confining limits of casing 12, the friction resisting motion and the resultant pressure forces in order to determine the ideal force of springs 16a–16j and gravity spring 36 which act on seal rings 13. The springs are selected and located with sufficient force and dimension under these conditions to cause seal ring segments 13 to behave as if they had less weight and to gently urge them toward the minimum clearance position. In the preferred arrangement, springs 16a–16j are located to urge the segments in a radial direction to cause them to seek the smaller diameters limited by the defined small or minimum clearance position, as shown in FIG. 1, to the point of contact between segment surface 13k and casing shoulder surface 17.

The minimum clearance position is attained whenever the seal ring is restrained by contact of seal ring surface 13b with casing surface 17, as shown in FIG. 1, or when the inner edge of seal teeth 14 is in contact with shaft or rotor 11.

The segment lengths are improved over previous six-segment packing designs which employed segments of approximately equal length in all circumferential positions. In the subject invention, the top and bottom segments are suggested to be of approximately 120° arcs, while four approximately equal 30° arc segments are employed at the sides, with one segment each above and below the horizontal joint on each side.

Use of the 120° bottom segment decreases the force required of the lower butt springs; also, since these springs are oriented closer to vertical, the lateral force component of these springs, which is applied to the rotor during rubbing periods is also reduced.

By use of one bottom gravity spring, it can be conveniently placed in a single bore hole 35 located in the packing segment 13*t*, eliminating the need to drill complicated multiple holes in casing or diaphragm 12. This also reduces assembly and disassembly problems, enabling packing installation or removal with the rotor in place.

Use of the 120° top segment reduces the side forces necessitated in the butt springs of either four or six equal arc segment designs previously employed, thus minimizing shaft rubbing forces.

Coil springs are shown in the drawings, but flat, L-shaped springs can be employed in locations 36, 16*i*, 16*e*, 16*f* and 16*g*.

Figure 3:
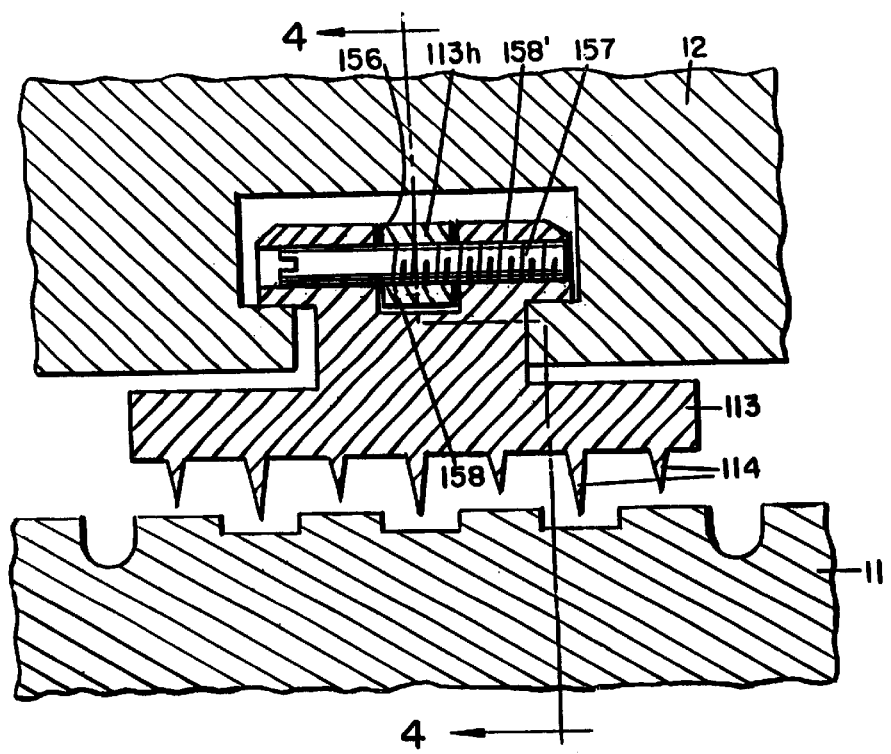
FIG. 3 is a partial longitudinal sectional view of a horizontal elevation showing a portion of a modified four segment seal ring with a hinged connection of two adjacent packing segments.
Figure 5:
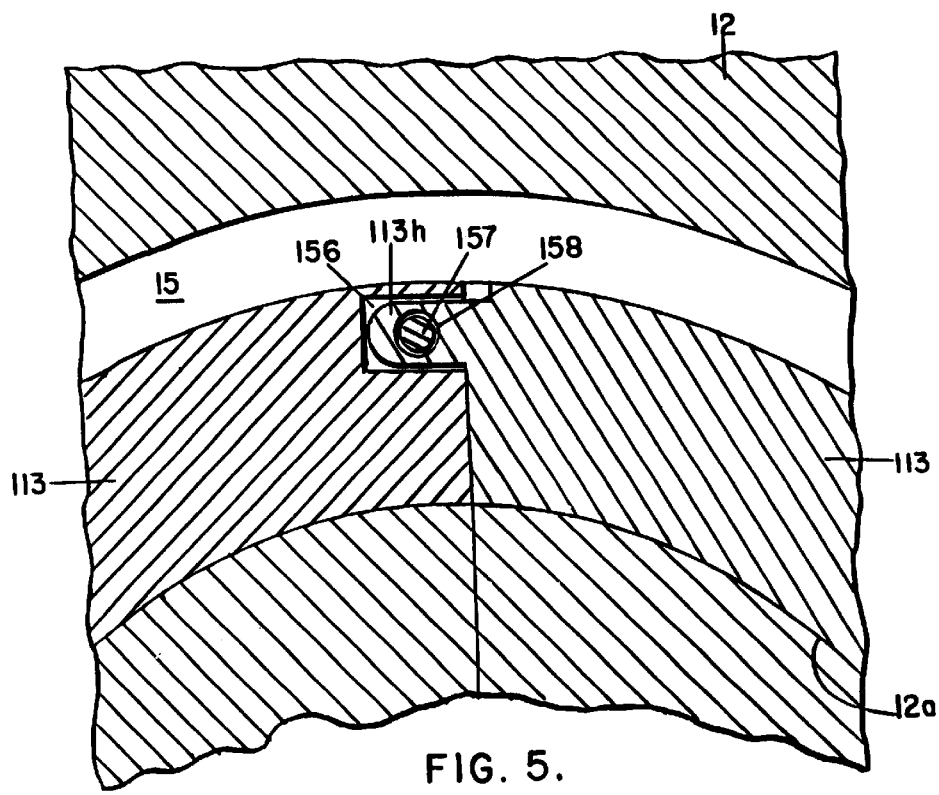
FIG. 5 is an enlarged, fragmentary, transverse cross sectional view of the upper hinge and pin arrangement shown in FIG. 4.
Figure 4:
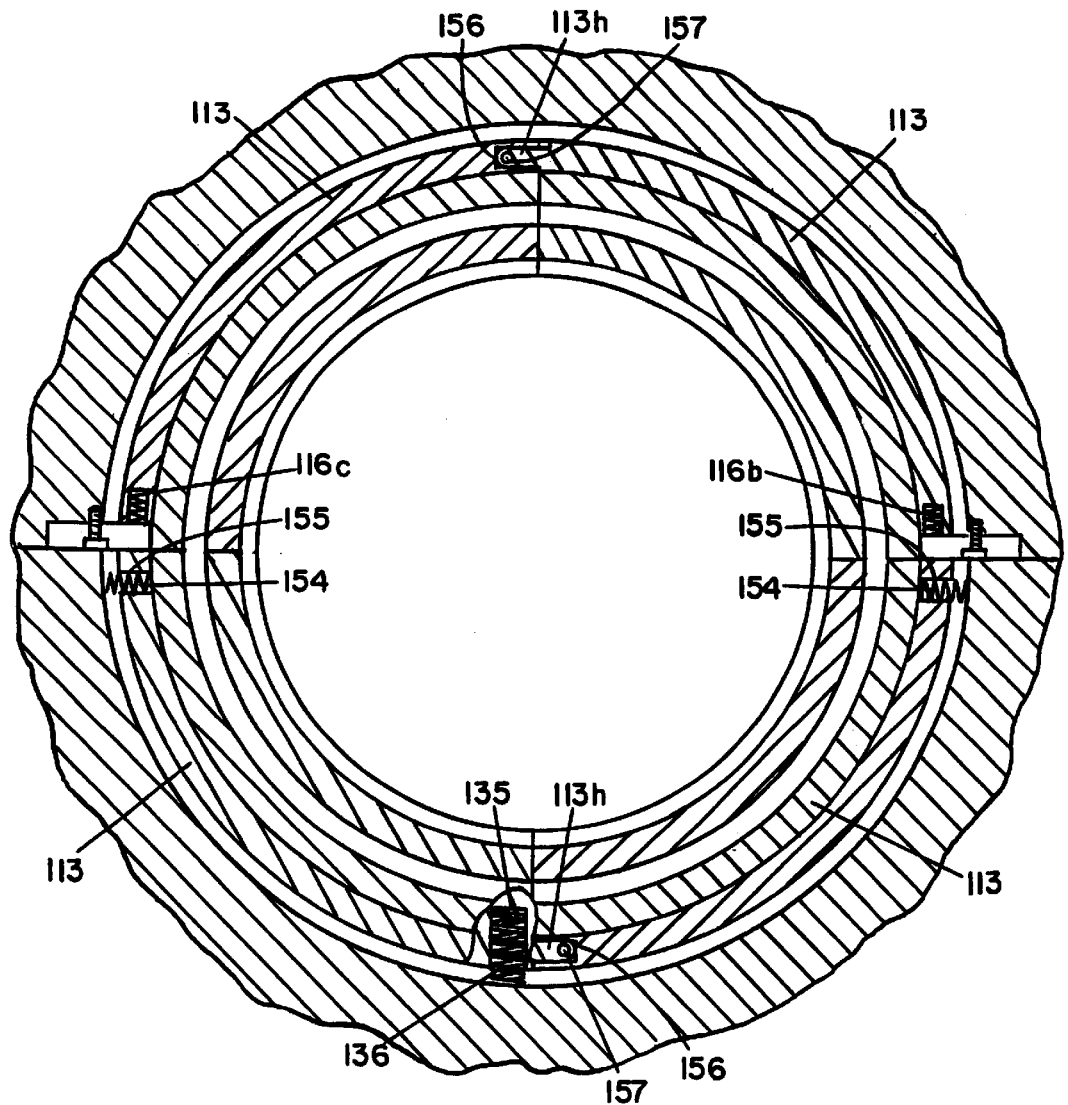
FIG. 4 is a transverse cross sectional view, taken along line 4—4 of FIG. 3, of a segmented seal ring and spring combination comprised of four segments, with two gravity springs to support the two upper segments which are hinged at the top, two side springs to bias the lower segments toward the small clearance position, and one gravity spring for the two bottom segments, with portions broken away to better illustrate the gravity spring in the bottom segment with hinged connections of the segments at the top and bottom.

The above discussion has described an improved six segment packing for low pressure drop packings. FIGS. 3, 4 and 5 illustrate an alternative system that employs two 90° segments for the upper half and two others for the lower half.

Those skilled in the art will be able to determine all forces described above thereby determining the spring forces required of the springs to achieve the objects of the invention described herein. It is preferred that all of the forces acting on each segment be summed for radial and circumferential components.

FIG. 3 is a top or bottom cross section of a packing ring 113 using an alternative system to those described above. At the top and bottom, as shown in FIG. 4, two 90° segments 113 intersect. An extension 113*h* of one of the segments penetrates into an opening 156 of the other segment. A pin 157 connects the two segments by passing through aligned openings 158 and 158' respectively in extension 113*h* of one segment and the adjacent end of the abutting segment so as to form a hinge that permits the two segments a small amount of motion in the opening direction, as indicated in FIGS. 3 and 5. Pin 157 is secured by threads.

Note that a conventional hinged spring could be fastened to the outer surface of the segments to perform the same function.

FIG. 4 shows that a gravity spring 136 contained in a bore 135 in the bottom of one of the 90° segments 113 has been provided to counter the weight plus a small safety factor of the two connected bottom segments when the segments are in the minimum clearance position.

Side helper springs 154, located in bores 155 of segments 113 can be included to insure an adequate closing force while allowing the segments to open during a shaft rubbing condition. The spring forces should counter, plus a small safety factor the downward component of the weight force pivoting on spring 136.

In the upper half, vertical springs 116*b* and 116*c* are provided to almost counter the weight of the two connected top segments when in the minimum clearance position. Side helper springs such as those described above for the lower half can also be used to help closure at the sides, but should not normally be required.

Figure 6:
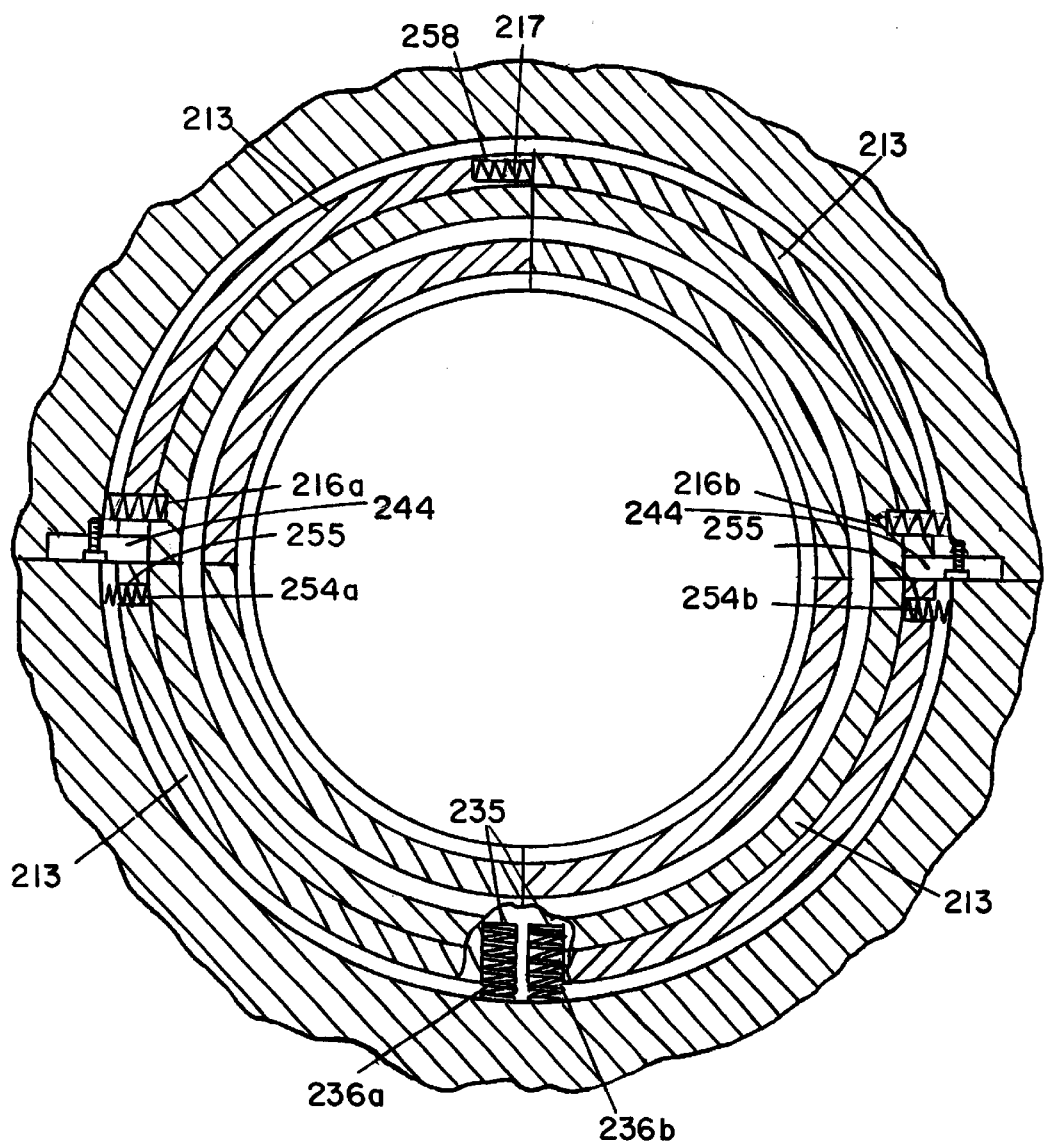
FIG. 6 is a transverse cross sectional view, of a modified segmented seal ring and spring combination comprised of four segments, with two gravity springs to support the two lower segments with portions broken away to illustrate the gravity springs in the bottom segments, and with side springs at the upper ends of the bottom segments to urge the sides to the close clearance position while in the upper half, the lower ends have springs to urge the segments to the close clearance position while at the top a spring mounted between the ends of the top segments tends to help separate the two segments during periods of shaft rubs against the packing segments.

FIG. 6 shows a different system using four 90° segments 213 with gravity springs 236*a* and 236*b* contained in bores 235 in the bottom of each of the 90° segments 213 that are provided to counter the weight plus a small safety factor of the two separate bottom segments when the segments are in the minimum clearance position.

There will be a tendency for the sides of the two bottom segments to spread open near the horizontal joint.

Side helper springs 254*a* and 254*b*, located in bores 255 of lower segments 213 can be included to insure an adequate closing force while allowing the segments to open during a shaft rubbing condition. The spring forces should counter, plus a small safety factor the downward component of the weight force pivoting on springs 236*a* and 236*b*.

In the upper half, side helper springs 216*a* and 216*b* are provided to urge the lower end of segments 213 to the minimum clearance position by helping to overcome the friction of motion of the seal segments against keeper keys 244.

A spring 217 is located in a bore 258 where the two top segments meet. This spring provides almost enough force to separate the two segments so as to minimize opening forces occurring during shaft rubbing conditions.

No spring is shown pushing downward on the top packing segments of any of the described systems. It should be recognized that time varying pressure forces do exist in the steam spaces adjacent to the packing segments. Such time varying forces can contribute to undesirable vibration and wear of packing segments. In the outer three packing rings of turbine sections, the time varying forces are relatively small and the weight of the top segment should be adequate to prevent such vibration.

In the middle of double flow turbine sections such as the intermediate and low pressure sections these time varying forces are greater and the addition of a top spring to help discourage such vibration would be prudent. The spring could be a coil type, such as spring 16*e* in FIG. 2, or a flat L shaped spring as has been used in conventional packing segments for many decades.

While the description and drawings have been provided for preferred embodiments of the present invention, various other modifications may be made without departing from the spirit and scope of the present invention.

Figure 7:
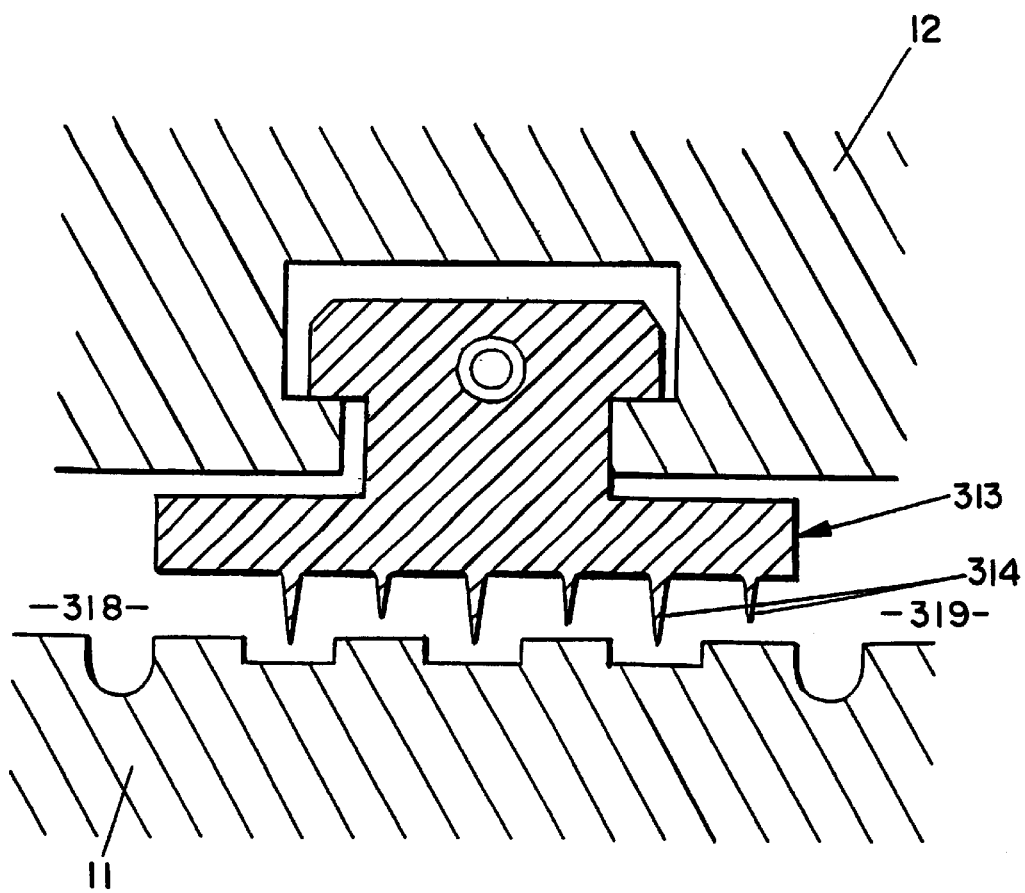
FIG. 7 is a partial longitudinal sectional view of a horizontal elevation of a portion of a modified seal seal ring, similar to that shown in FIG. 1.

FIG. 7 is a cross sectional drawing of a modified packing ring 313. In the case of a packing ring where the closing pressure forces are very large, the force required from the shaft during temporary periods of misalignment and rubbing will be very large and the heat generated will also be very large. This condition can be improved by removing one or more teeth 314 from the inlet side 318 of the packing. FIG. 7 illustrates this modification, where one tooth on the inlet side has been removed from a ring that is otherwise the same as that shown in FIG. 1.

Figure 7A:
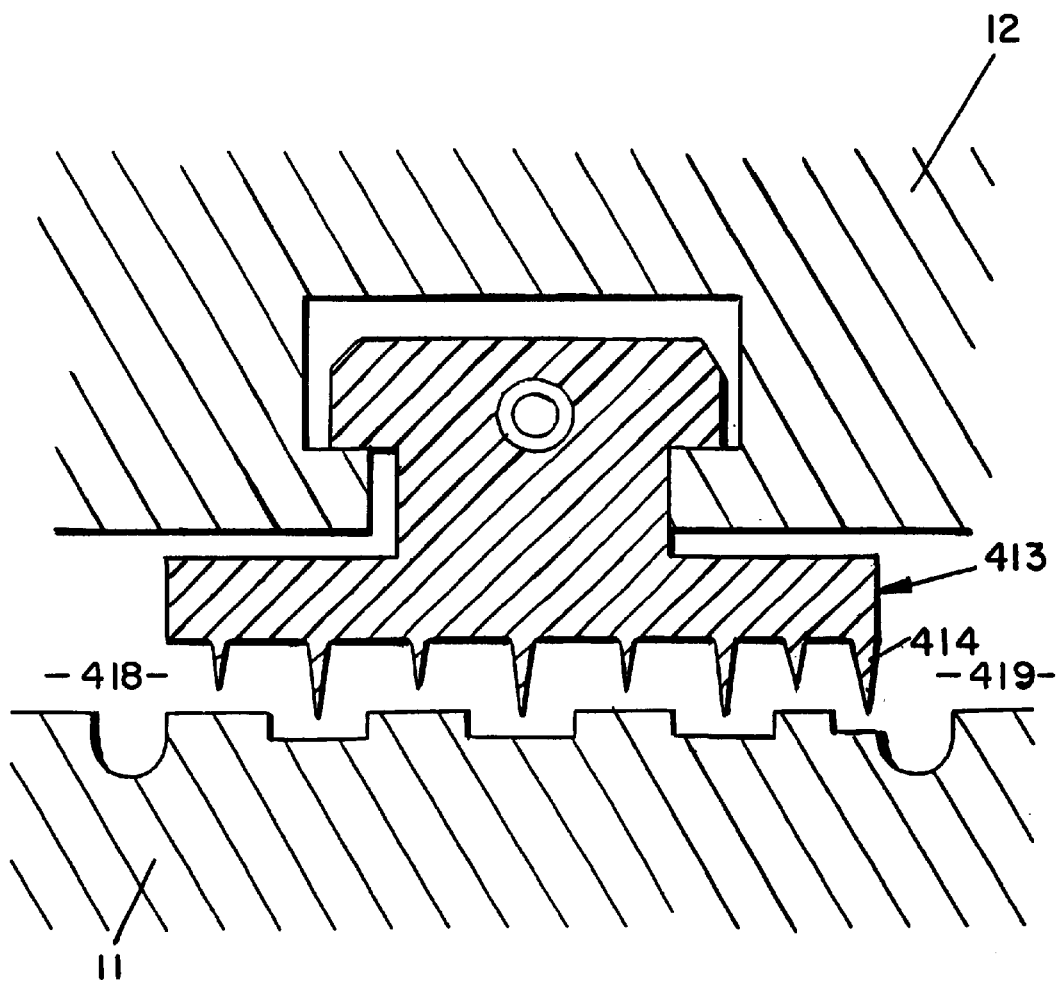
FIG. 7A is a partial longitudinal sectional view of a horizontal elevation of a portion of a further modified seal ring similar to FIG. 7.

A similar improvement could be accomplished by adding a tooth 414 to the discharge side 419 as shown in the modified packing ring 413 of FIG. 7A.

In segmented seal rings of the type discussed in this invention there will be times when the pressure drop and flow direction will reverse during the various operating conditions. To assure proper operation, it is important that the higher pressure steam be permitted to enter the space 15 in FIG. 1, yet not be allowed to freely pass from that space into the low pressure zones.

Figure 8:
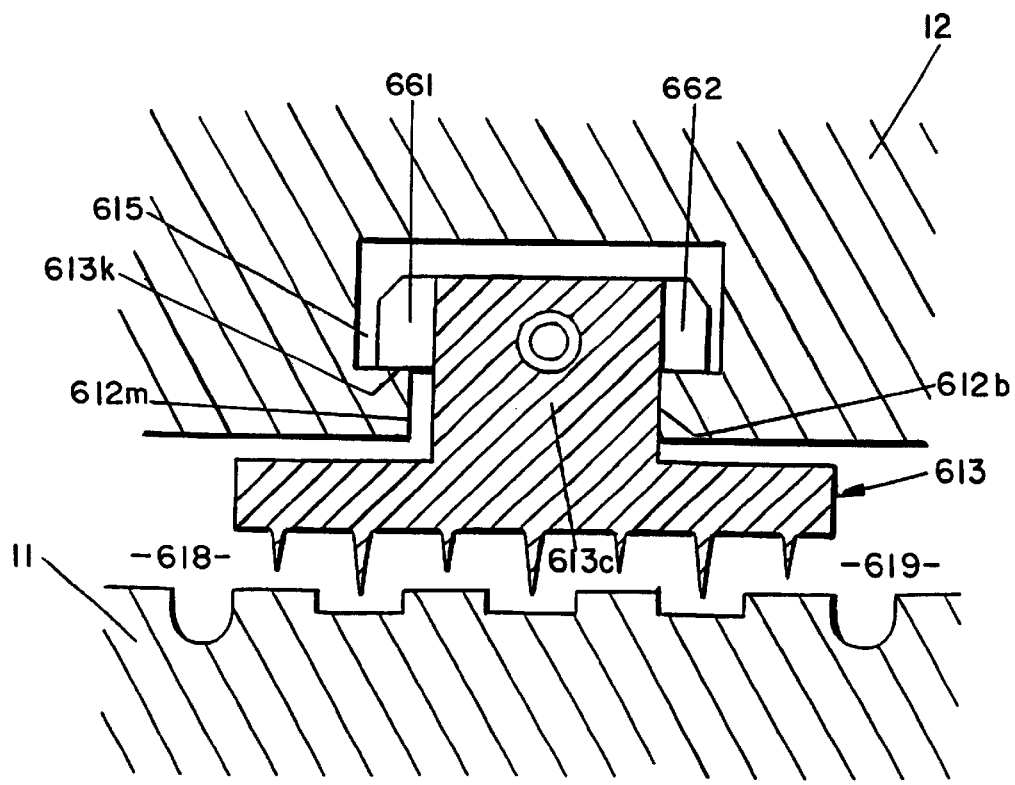
FIG. 8 is a partial longitudinal section of a still further modified seal ring.

FIG. 8 shows a design provided to accomplish this condition regardless of the flow direction. In FIG. 8, the flow is shown to be traveling from left to right or from 618 to 619. It can enter a space 615 above a packing ring 613 by passing through slots 661 and 662 in the segment hooks at surface 613*k*, causing space 615 to become pressurized. Flow is discouraged from passing through the corresponding slots by the tight contact of the segment 613 with the casing at 612*b*. The inner surfaces of the slots should be in line with with the outer surfaces of the segment neck 613*c*.

Should the direction of flow and pressure drop reverse, the packing segment would shift to the left, creating a seal at 612*m*, and simultaneously opening a passage to space 615 from the high pressure area which is now at 619.

What is claimed is:

1. An elastic fluid turbine employing a seal ring having segments to minimize leakage between a rotating turbine shaft and stationary components, while also permitting outward motion of the segments with reduced force by the turbine shaft during conditions when the shaft is rubbing against the segments providing a large reduction in heat generation due to friction between said components during start up and at light loads to protect both said seal ring and turbine shaft from damage, comprising:

a stationary turbine casing encircling the rotating shaft and having an annular groove formed therein and extending circumferentially around said shaft, said annular groove being partially defined by a pair of opposing, spaced apart annular shoulders on said casing which form an annular opening of said groove radially into a clearance area between said casing and said shaft;

the seal ring supported by and at least partially contained in said groove, said seal ring including upper seal segments located around the upper half of said shaft and lower seal segments located around the lower half of said shaft, each seal segment having seal teeth;

radial springs positioned against said seal segments to urge said seal segments radially inward to form a smaller diameter ring providing a small clearance position of said seal ring with said shaft, said small clearance position being limited by surface contact between the seal ring and the casing, said radial springs acting in combination with circumferential springs which act between segment butts to provide forces whose vertical component acts against the segment positioned above the spring to reduce the effective weight of the segment so as to reduce the force on the shaft required to deflect the segment outward during periods of rubbing, said circumferential springs being assisted by at least one vertical gravity spring located between the lower casing and at least one bottom segment to provide a vertical force slightly greater than the weight of all the seal ring segments supported by said at least one gravity spring so that the effect of all the springs is to cause the segments to be normally positioned in the small clearance position yet be capable of easy outward motion when pushed by the shaft during rubbing conditions with the shaft.

2. An elastic fluid turbine as recited in claim 1 wherein said segmented seal ring comprises four 90° segments, two upper segments and two lower segments, with the lower segments each supported at the bottom by a single vertical gravity spring which effectively reduces the weight of the segments while pushing upward with a force slightly greater than the weight of the lower segment, two additional side springs providing a radially inward force just below a horizontal joint on the outside of each lower seal ring segment to help provide a closing force following a condition where the shaft forces said segments open, the two segments of the upper half being supported by keys at the horizontal joint and provided with side springs which push each segment toward the shaft at the horizontal joint, while at the top, between the ends of the two segments, a circumferential spring between the ends of the top two segments for providing a force tending to separate the two segments, said spring not having adequate force to cause such separation but reducing the force required from the shaft to cause the segments to move.

* * * * *